United States Patent
Spangler, Jr.

(10) Patent No.: US 7,909,404 B2
(45) Date of Patent: Mar. 22, 2011

(54) INDEPENDENT HEIGHT ADJUSTMENT SYSTEM FOR A SEAT ASSEMBLY AND MACHINE USING SAME

(75) Inventor: John C. Spangler, Jr., Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 261 days.

(21) Appl. No.: 12/154,067

(22) Filed: May 20, 2008

(65) Prior Publication Data
US 2009/0289487 A1    Nov. 26, 2009

(51) Int. Cl.
*A47C 1/00* (2006.01)
(52) U.S. Cl. .......... 297/344.12; 297/344.18; 297/344.19
(58) Field of Classification Search .................. 248/564; 297/DIG. 10, 344.12, 344.18, 344.19, 452.41, 297/DIG. 8, 199
See application file for complete search history.

(56) References Cited

U.S. PATENT DOCUMENTS

| | | | |
|---|---|---|---|
| 3,982,786 A | | 9/1976 | Burgin et al. |
| 3,983,640 A * | | 10/1976 | Cardullo et al. ............... 434/59 |
| 4,030,207 A * | | 6/1977 | Kron ............................... 434/59 |
| 4,374,497 A * | | 2/1983 | Harmand ............................ 108/4 |
| 4,778,216 A | | 10/1988 | Stupakis |
| 4,865,388 A * | | 9/1989 | Nemoto .......................... 297/403 |
| 4,993,736 A * | | 2/1991 | Garman et al. ............. 280/304.1 |
| 5,375,910 A * | | 12/1994 | Murphy ..................... 297/256.13 |
| 5,377,366 A * | | 1/1995 | Boyd et al. ...................... 4/561.1 |
| 5,435,623 A * | | 7/1995 | Kapec et al. ................... 297/339 |
| 5,441,466 A * | | 8/1995 | Piaget et al. .................... 482/52 |
| 5,579,544 A * | | 12/1996 | Attler ............................ 4/566.1 |
| 6,990,920 B2 | | 1/2006 | Hamilton et al. |
| 7,364,229 B2 * | | 4/2008 | Lee .......................... 297/180.16 |
| 2006/0082210 A1* | | 4/2006 | Fletcher et al. .......... 297/452.41 |
| 2006/0152062 A1 | | 7/2006 | Archambault et al. |
| 2006/0237885 A1 | | 10/2006 | Paillard et al. |
| 2007/0069563 A1 | | 3/2007 | Herzog |
| 2007/0176403 A1 | | 8/2007 | Calderone |
| 2007/0284927 A1 | | 12/2007 | Therer et al. |

\* cited by examiner

*Primary Examiner* — Sarah B McPartlin
(74) *Attorney, Agent, or Firm* — Liell & McNeil Attorneys, PC

(57) ABSTRACT

A height adjustment system for a seat assembly of a machine includes a first support member and a second support member vertically spaced from the first support member. A pneumatic bladder is operatively connected to the first support member and the second support member for adjusting a distance between the first support member and the second support member. At least two guide pins interconnect the first support member and the second support member at opposing ends thereof. A locking device maintains an adjusted distance between the first support member and the second support member. The height adjustment system is preferably independent from and may be positioned in series with a suspension system for the seat assembly.

10 Claims, 4 Drawing Sheets

INDEPENDENT HEIGHT ADJUSTMENT SYSTEM FOR A SEAT ASSEMBLY AND MACHINE USING SAME

TECHNICAL FIELD

The present disclosure relates generally to an independent height adjustment system for a seat assembly, which may be positioned in series with a suspension system for the seat assembly.

BACKGROUND

In many on-highway and off-highway operations, an operator must remain seated for extended periods of time while controlling operation of a machine. Seats, therefore, are typically designed to permit the operator to perform tasks from a comfortable position and isolate the operator, as much as possible, from vibrations of the machine. This may be particularly important for machines operating over a rugged terrain that may cause extreme vibrations of the machine. Such vibrations, as should be appreciated, may interfere with operator control and may cause the operator to fatigue more quickly.

As a result, a variety of seat suspensions have been designed to absorb and/or dissipate the forces imparted to the seat. Various means have also been adopted to permit adjustment of the height of the seat to accommodate operators of various sizes. Such adjustment means is generally arranged to operate within the base area below the seat and is typically mechanically and/or electronically actuated. In many arrangements, regardless of the type of suspension system employed, the height adjustment means is often coupled with the seat suspension.

For example, many passive suspension systems utilize an air spring, in conjunction with other devices, for both seat suspension and height adjustment. Although both functions may be adequately performed, it should be appreciated that, by coupling the seat suspension and the height adjustment, a certain level of dependence is placed thereon. Specifically, adjusting the seat height by increasing or decreasing the amount of pressurized air within the air spring may undesirably alter the suspension. Therefore, it may be desirable to separate the suspension and height adjustment functions provided for the seat.

U.S. Publication No. 2007/0284927 teaches a suspension for a seat that is independent of height adjustment. Specifically, separate air bags are provided for suspension and height adjustment. In an effort to provide a more compact base for the seat, the height adjustment air bag is configured to receive the suspension air bag within a central portion thereof. In addition, the height adjustment air bag, being telescopically adjusted around an empty metallic cylinder, is configured to fold itself completely within its allocated height in order to allow for a relatively low minimum seat height. It should be appreciated, however, that there is a continuing need for versatile suspensions that are simply constructed and inexpensive, while still providing the necessary absorption of vibrations and desired range of height adjustment.

The present disclosure is directed to one or more of the problems set forth above.

SUMMARY OF THE DISCLOSURE

In one aspect, a height adjustment system for a seat assembly of a machine includes a first support member and a second support member vertically spaced from the first support member. A pneumatic bladder is operatively connected to the first support member and the second support member for adjusting a distance between the first support member and the second support member. At least two guide pins interconnect the first support member and the second support member at opposing ends thereof. A locking device maintains an adjusted distance between the first support member and the second support member.

In another aspect, a method of adjusting a seat assembly of a machine includes a step of releasing a locking device of at least two telescoping guide pins. A distance between a first support member and a second support member is adjusted, at least in part, by adjusting an amount of pressurized air within a pneumatic bladder. The method also includes a step of engaging the locking device of each of the two telescoping guide pins.

In yet another aspect, a machine includes a first support member attached to a body of the machine. A second support member is vertically spaced from the first support member and defines a first support area. A third support member is vertically spaced from the second support member and defines a second support area. One of a seat height adjustment system and a seat suspension system is positioned within the first support area and the other of the seat height adjustment system and the seat suspension system is positioned within the second support area.

DETAILED DESCRIPTION

Figure 1:
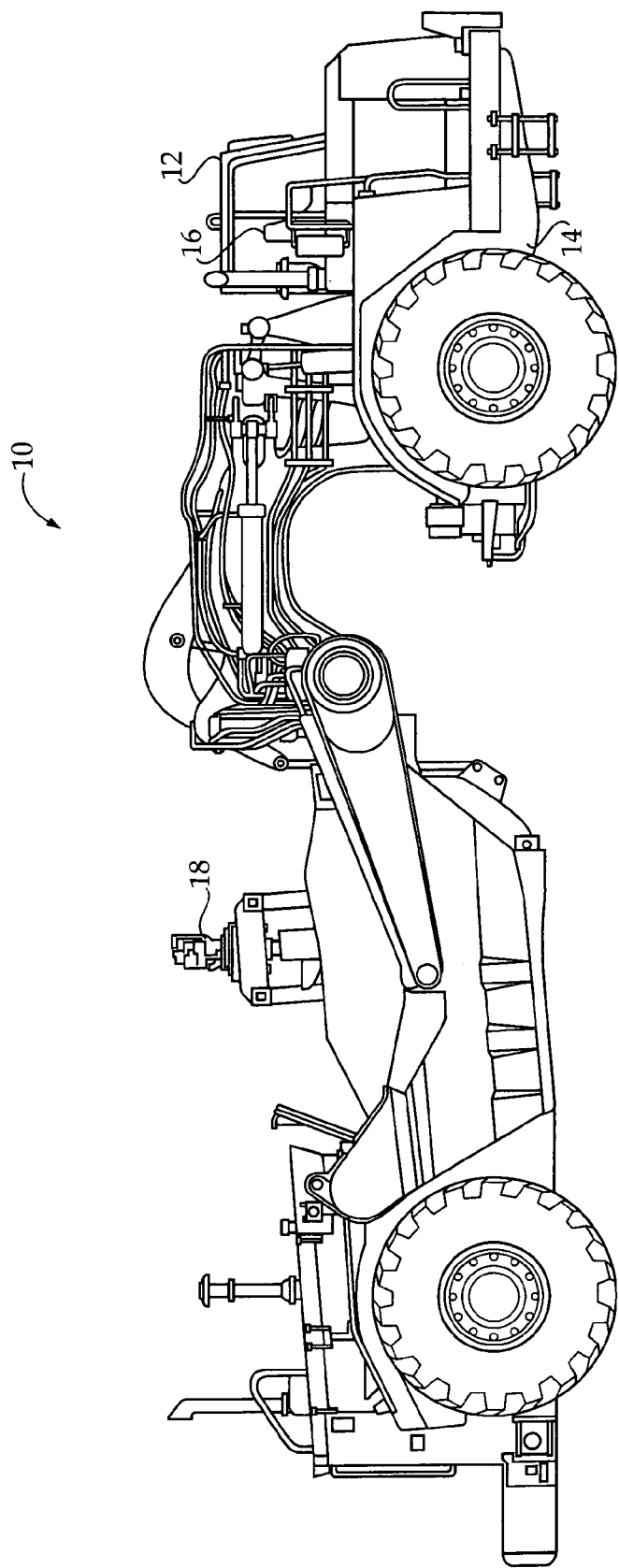
FIG. 1 is a side diagrammatic view of a machine according to the present disclosure.

An exemplary embodiment of a machine 10 is shown generally in FIG. 1. The machine 10 may be a wheel tractor scraper, as shown, or any other machine or vehicle, having an operator control station 12. Other machines may include, but are not limited to, wheeled log skidders, track-type tractors, wheel loaders, articulated trucks, and other types of construction, mining, and agricultural machines. The operator control station 12 is mounted to a machine body 14, or frame, of the machine 10 and may include a seat assembly 16. The operator control station 12 may include various other devices, including, but not limited to, one or more machine operation controllers. For example, a machine operation controller may be provided for controlling movement of an implement 18, such as an auger, of the machine 10.

Figure 2:
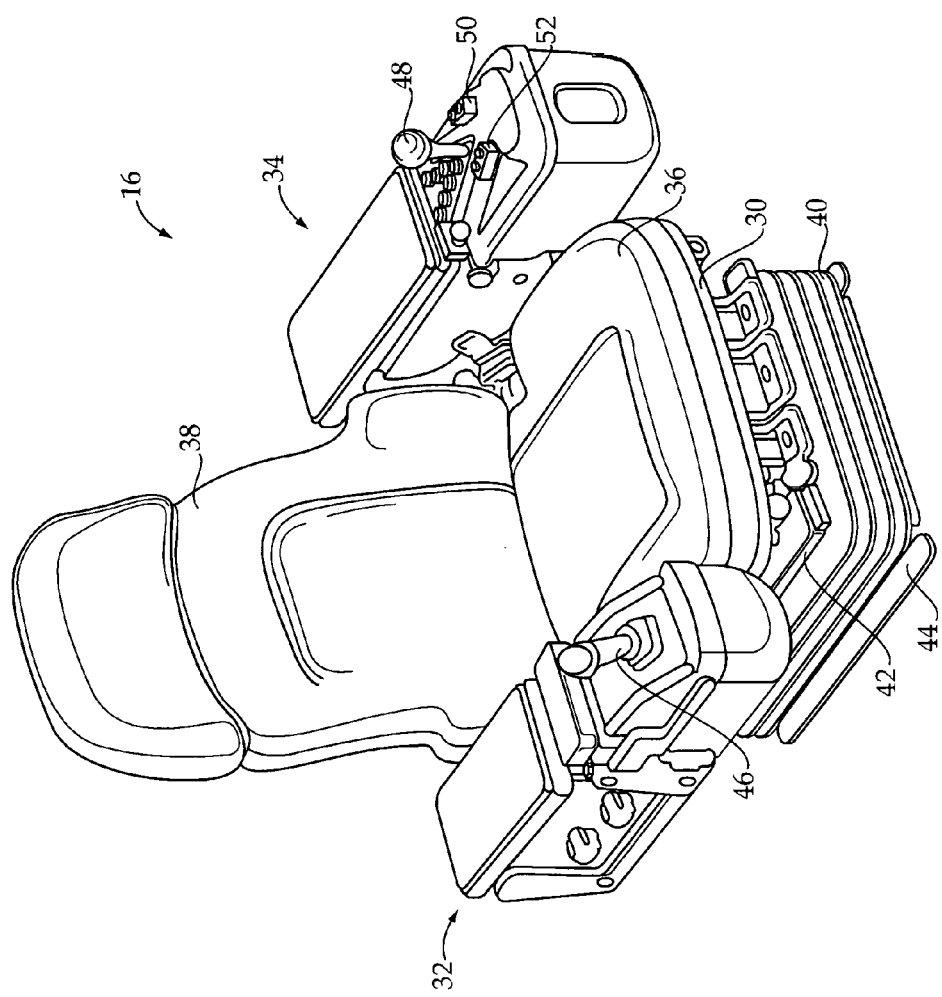
FIG. 2 is a perspective view of a seat assembly of the machine of FIG. 1.

The seat assembly 16 is shown generally in FIG. 2, and may include a seat frame 30 to which a first armrest 32, a second armrest 34, a seat 36, and a back 38 may be attached. The seat frame 30 may include or may be mounted on a base 40. Specifically, the base 40 may include an upper support member 42 for supporting the seat frame 30 and a lower support member 44 that is attached to the machine body 14. The seat assembly 16 may also include one or more machine operation controllers, such as controllers 46 and 48 pivotably attached to the first armrest 32 and second armrest 34, respectively. Machine operation controllers 46 and 48 may be used to control various operations of the machine 10. For example, machine operation controller 46 may include a directional controller, while machine operation controller 48 may be used to control movement of the implement 18 of the machine 10. The seat assembly 16 may also include a height adjustment actuator 50 and a tilt adjustment actuator 52, both of which will be discussed later in greater detail.

Figure 3:
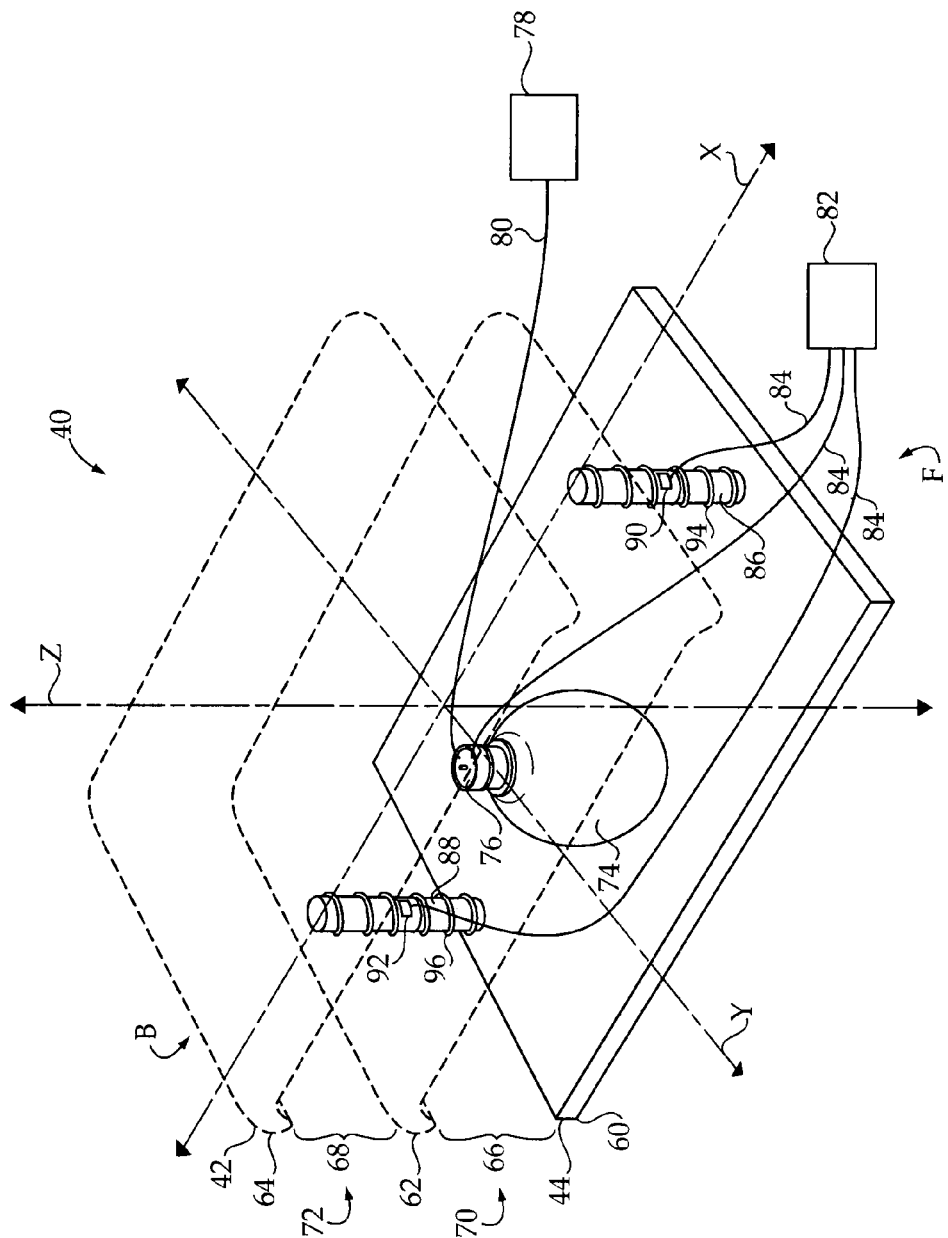
FIG. 3 is a perspective view of one embodiment of a height adjustment system of the seat assembly of FIG. 2.

Turning now to FIG. 3, an exemplary embodiment of the base 40 is shown in greater detail. The base 40 may include a first support member 60, such as the lower support member 44 of FIG. 2, a second support member 62, and a third support member 64, such as the upper support member 42 of FIG. 2. The third support member 64 may be vertically spaced from the first support member 60, as shown. Referring again to FIGS. 1 and 2, it should be appreciated that the first support member 60 may be attached to the machine body 14 using any known attachment means, while the third support member 64 may include the seat 36 or, alternatively, the seat frame 30 mounted thereon. The base 40 may also include the second support member 62 positioned between the first support member 60 and the third support member 64. Each of the first support member 60, second support member 62, and third support member 64 may include a generally planar support plate, as shown, or may include structures having various other shapes and/or cross sections.

The second support member 62 may be vertically spaced from the first support member 60 and may define a first support area 66. In addition, the third support member 64 may be vertically spaced from the second support member 62 and may define a second support area 68. According to one embodiment, a height adjustment system 70, or seat height adjustment system, may be positioned within the first support area 66 and a suspension system 72, or seat suspension system, may be positioned within the second support area 68. It should be appreciated, however, that the height adjustment system 70 may be positioned within the second support area 68, while the suspension system 72 may be positioned within the first support area 66. In either arrangement, the height adjustment system 70 and the suspension system 72 are positioned in series between the first support member 60 and the third support member 64.

The suspension system 72 may include any suspension system, including passive, active, or semi-active suspension systems for absorbing and/or dissipating any forces or vibrations imparted to the seat assembly 16. Such seat suspension systems are well known and may include any of a variety of components for providing suspension, damping, and/or guidance, as is well known in the art. The suspension system 72, as incorporated into the base 40, is independent from and positioned in series with the height adjustment system 70 described herein and should not be limited to any particular seat suspension system.

The height adjustment system 70 may include one or more components for adjusting a height of the seat assembly 16 or, more specifically, the seat 36, independently from the suspension system 72. To facilitate such height adjustment, the height adjustment system 70 may incorporate a pneumatic bladder 74 for adjusting a distance between the first support member 60 and the third support member 64. More specifically, the pneumatic bladder 74 may be operatively connected to the first support member 60 and the second support member 62 for adjusting a distance between the first and second support members 60 and 62 and, as such, adjusting a vertical height of the first support area 66. Although the exemplary embodiment depicts the height adjustment system 70 disposed within the first support area 66, the height adjustment system 70 may alternatively be disposed within the second support area 68 and may include components similar to those described herein.

The pneumatic bladder 74 may include any structure, such as a flexible walled structure, configured to hold pressurized air. Although pressurized air is described, it should be appreciated that various other fluids may, alternatively, be used. According to one embodiment, the pneumatic bladder 74 may include an air spring or air bag, both of which are known in the art. The specific dimensions, configuration, and positioning of the pneumatic bladder 74 may vary depending on the desired height adjustment control of the seat assembly 16. The pneumatic bladder 74 may also include an electronically actuated valve 76 in communication with a pneumatic source 78, such as, for example, an air compressor, or other fluid source via one or more pneumatic lines 80.

An electronic controller 82 may also be provided for use with the seat assembly 16. The electronic controller 82 may be of standard design and may include a processor, such as, for example, a central processing unit, a memory, and an input/output circuit that facilitates communication internal and external to the electronic controller 82. The processor may control operation of the electronic controller 82 by executing operating instructions, such as, for example, computer readable program code stored in memory, wherein operations may be initiated internally or externally to the electronic controller 82. A control scheme may be utilized that monitors outputs of systems or devices, such as, for example, sensors, actuators, or control units, via the input/output circuit to control inputs to various other systems or devices.

The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controller 82. One skilled in the art will appreciate that any computer based system or device utilizing similar components for controlling the electronically actuated valve 76, and other components or devices described herein, is suitable for use with the present disclosure.

The electronic controller 82 may communicate, via one or more wired and/or wireless communication lines 84, with the electronically actuated valve 76 to selectively vary the amount of fluid, such as pressurized air, within the pneumatic bladder 74. For example, the electronic controller 82 may communicate with the electronically actuated valve 76 to control the flow of pressurized air between the pneumatic source 78 and the pneumatic bladder 74. Specifically, the electronically actuated valve 76 may operate to supply pressurized air to or divert pressurized air from the pneumatic bladder 74. According to one embodiment, the electronically actuated valve 76 may also operate to release pressurized air from the pneumatic bladder 74 and into the ambient air. It should be appreciated that a pump (not shown) may also be provided for pressurizing the air, or other fluid, in the pneumatic source 78.

According to one embodiment, the electronic controller 82 may be in communication with both of the electronically actuated valve 76 and the height adjustment actuator 50 of FIG. 2. For example, the height adjustment actuator 50 may be movable to increase or decrease the volume of air within the pneumatic bladder 74 to raise or lower the bladder 74, thereby adjusting the seat assembly 16 to a desired height. More specifically, the electronic controller 82 may be configured to issue signals to the electronically actuated valve 76 of the pneumatic bladder 74, to increase or decrease the amount of pressurized air therein, in response to a command from the height adjustment actuator 50.

The pneumatic bladder 74 may also include a sensor, such as, for example, a pressure sensor (not shown), configured to sense an amount and/or a pressure of fluid, such as air, within the pneumatic bladder 74. The electronic controller 82 may monitor the pressure sensor, and additional sensors associated with the pneumatic bladder 74, and adjust a control scheme for actuating the electronically actuated valve 76 based on the sensed pressure(s) and/or commands from the height adjustment actuator 50. It should be appreciated that various other sensors may also be used for detecting various conditions of the pneumatic bladder 74 and/or seat assembly 16.

The height adjustment system 70 may also include a plurality of guide pins, such as telescoping guide pins 86 and 88. Although two telescoping guide pins 86 and 88 are shown, it should be appreciated that any number of guide pins may be used, including a minimum of one guide pin. The telescoping guide pins 86 and 88 may be vertically aligned with respect to a vertical axis Z, as shown, and telescopically movable to maintain vertical alignment of the first and second support members 60 and 62 during movement of the pneumatic bladder 74. According to one embodiment, the telescoping guide pins 86 and 88 may interconnect the first and second support members 60 and 62 at opposing ends thereof, such as at a front F and a back B portion thereof.

Telescoping guide pins 86 and 88 are known to those skilled in the art and may include any type and/or configuration of telescoping posts, such as those including tubes and rods. Alternatively, however, it should be appreciated that various other guiding means may be used. For example, either or both of the first and second support members 60 and 62 may incorporate linear bearings for receiving linear guide pins therethrough. As such, the linear guide pins may not change in length but may allow adjustment of a vertical height of the first support area 66, as desired. It should be appreciated that any number, size, and arrangement of the telescoping guide pins 86 and 88, or linear guide pins, may be selected for use with the height adjustment system 70.

One or both of the telescoping guide pins 86 and 88 may include a locking device, such as, for example, locking devices 90 and 92, for maintaining the vertical height, such as an adjusted vertical height, of the first support area 66. According to one embodiment, the locking devices 90 and 92 may each include a friction lock device for maintaining a height of a respective one of the telescoping guide pins 86 and 88. For example, such a friction lock device may include one or more components configured to frictionally engage a portion of the respective telescoping guide pin 86 and 88 to prevent telescopic movement thereof. As should be appreciated, the locking devices 90 and 92 may include components that are internal to or external from the telescoping guide pins 86 and 88.

According to one embodiment, the locking devices 90 and 92 may be electronically actuated and, according to one embodiment, may be movable between an engaged and disengaged, or released, configuration using an electronic actuator, such as, for example, a solenoid. Although specific examples are given, however, it should be appreciated that any locking feature capable of maintaining a height of the telescoping guide pins 86 and 88 may be used for locking devices 90 and 92, also referred to herein as electronically actuated locking devices.

The electronic controller 82 may also be in communication with the electronically actuated locking devices 90 and 92 via communication lines 84. For example, the electronic controller 82 may be configured to issue signals to the electronically actuated locking devices 90 and 92 in response to a command from the height adjustment actuator 50. More specifically, the electronic controller 82 may issue one or more signals to the electronically actuated locking devices 90 and 92, to release or disengage a locking feature thereof, just prior to or near simultaneously with actuation of the electronically controlled valve 76. After a selected height adjustment of the pneumatic bladder 74, the electronic controller 82 may issue signals to the electronically actuated locking devices 90 and 92 to engage the locking features thereof and prevent telescopic movement of telescoping guide pins 86 and 88. It should be appreciated that, according to one embodiment, the locking features may be engaged by removing an electronic signal to the electronically actuated locking devices 90 and 92.

According to another embodiment, the telescoping guide pins 86 and 88 may be pivotably connected to one or both of the first and second support members 60 and 62, thus allowing the operator to tilt the seat assembly 16. For example, the operator may actuate the height adjustment actuator 50 to increase or decrease the height of the seat assembly 16. In response to the actuation, the electronic controller 82 may issue signals to the electronically actuated locking devices 90 and 92 to release a locking feature and allow telescopic movement of the telescoping guide pins 86 and 88. While the electronically actuated locking devices 90 and 92 are disengaged or released, the electronic controller 82 may issue one or more signals to the electronically actuated valve 76 to adjust the amount of pressurized air within the pneumatic bladder 74. In addition, the operator may urge the seat assembly 16, and the second support member 62, about one or both of a horizontal axis X and a horizontal axis Y to achieve a desired tilt. Releasing the height adjustment actuator 50 may, again, cause the electronic controller 82 to issue signals to the electronically actuated locking devices 90 and 92 to engage a locking feature thereof, thereby maintaining the selected height and/or tilt of the seat assembly 16. According to one embodiment, the locking features may be engaged by removing an electronic signal to a solenoid.

The height adjustment system 70 may also include one or more springs, such as extension springs 94 and 96, operatively connected to the first support member 60 and the second support member 62 for biasing the second support member 62 toward the first support member 60. Such a bias, as should be appreciated, may serve to maintain a compression of the pneumatic bladder 74, such as when the locking features of the electronically actuated locking devices 90 and 92 are disengaged. It should be appreciated that the number, size, and/or arrangement of springs, such as extension springs 94 and 96, may be selected for desired performance of the height adjustment system 70. Although the extension springs 94 and 96 are shown positioned around the telescoping guide pins 86 and 88, it should be appreciated that numerous alternative positions are contemplated.

Figure 4:
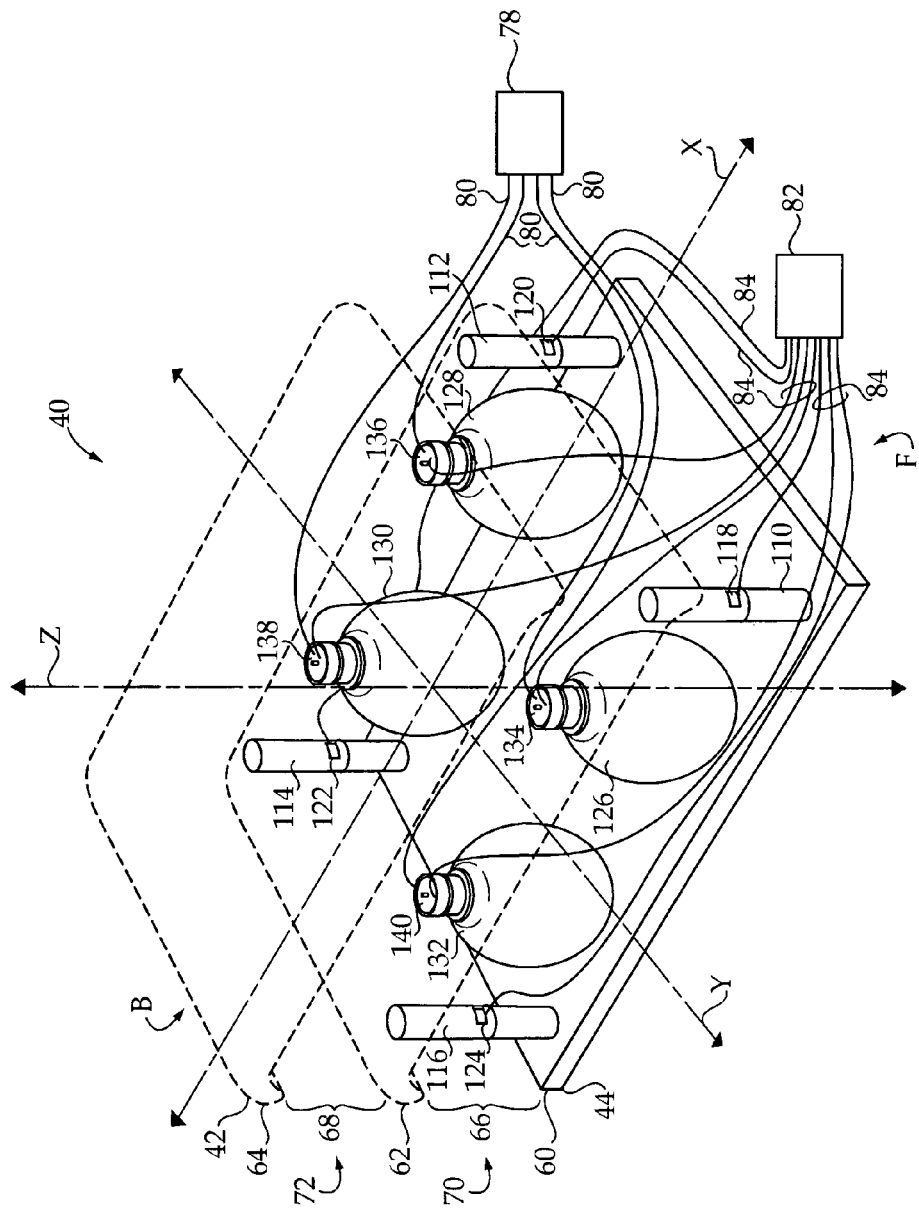
FIG. 4 is a perspective view of another embodiment of a height adjustment system of the seat assembly of FIG. 2.

Turning now to FIG. 4, an alternative embodiment of the height adjustment system 70 is shown. Specifically, the height adjustment system 70 may include four telescoping guide pins 110, 112, 114, and 116 interconnecting the first and second support members 60 and 62 at perimeters thereof. The telescoping guide pins 110, 112, 114, and 116 may each be similar to the telescoping guide pins 86 and 88 of FIG. 3 and may include electronically actuated locking devices 118, 120, 122, and 124, respectively. Although extension springs are not shown in FIG. 4, they may also be incorporated into this embodiment or any alternatives thereof. The telescoping guide pins 110, 112, 114, and 116 may also be pivotably connected to one or both of the first and second support members 60 and 62 to allow a tilt adjustment of the seat assembly 16.

The height adjustment system 70 may also include a plurality of pneumatic bladders, such as, pneumatic bladders 126, 128, 130, and 132, for independently adjusting the vertical height of the first support area 66. Each of the pneumatic bladders 126, 128, 130, and 132, similar to the pneumatic bladder 74 of FIG. 3, may be operatively connected to the first support member 60 and the second support member 62 for adjusting the distance between the first and second support members 60 and 62. The pneumatic 126, 128, 130, and 132 may also include electronically actuated valves 134, 136, 138, and 140, respectively.

According to one embodiment, the electronic controller 82 may communicate, via communication lines 84, with each of the electronically actuated valves 134, 136, 138, and 140 to selectively vary the amount of pressurized air within each of the pneumatic bladders 126, 128, 130, and 132, respectively. Specifically, the electronic controller 82 may communicate with the electronically actuated valves 134, 136, 138, and 140 to control the flow of pressurized air between the pneumatic source 78 and the pneumatic bladders 126, 128, 130, and 132. According to one embodiment, the electronic controller 82 may be in communication with the electronically actuated valves 134, 136, 138, and 140, the height adjustment actuator 50 (FIG. 2), and the tilt adjustment actuator 52 (FIG. 2). The height adjustment actuator 50, as described above, may be movable to adjust the seat assembly 16 to a desired height. Specifically, the electronic controller 82 may issue signals to each electronically actuated valve 134, 136, 138, and 140 to uniformly increase or decrease the volume of air within the pneumatic bladders 126, 128, 130, and 132. It should be appreciated that electronic controller 82 may also issue signals to the electronically actuated locking devices 118, 120, 122, and 124, both prior and subsequent to actuation of the electronically controlled valves 134, 136, 138, and 140, as described above.

The electronic controller 82 may also be in communication with the tilt adjustment actuator 52 of FIG. 2, which may be movable to actively adjust a tilt of the seat assembly 16. Specifically, the electronic controller 82 may issue signals to one or more of the electronically actuated valves 134, 136, 138, and 140 to increase or decrease the volume of air within the pneumatic 126, 128, 130, and 132 in response to a command from the tilt adjustment actuator 52. For example, since the electronic controller 82 may individually control a fluid amount within each of the pneumatic bladders 126, 128, 130, and 132, the second support member 62 may be rotated about one or both of the horizontal axis X and the horizontal axis Y. It should be appreciated that numerous algorithms, ranging from relatively simple to relatively complex algorithms, are contemplated for selectively increasing or decreasing air within the pneumatic bladders 126, 128, 130, and 132 to achieve a desired tilt. It should be appreciated that electronic controller 82 may issue signals to the electronically actuated locking devices 118, 120, 122, and 124, both prior and subsequent to actuation of the electronically controlled valves 134, 136, 138, and 140.

It should be appreciated that the height adjustment system 70 may include alternative and/or additional components, as necessary, to provide the desired height and/or tilt adjustment. In addition, it is preferred that the height adjustment system 70 include components positioned within one of the first and second support areas 66 and 68, and be configured to provide only height and/or tilt adjustment of the seat assembly 16. Specifically, the suspension system 72 may be positioned within the other of the first and second support areas 66 and 68 for providing only suspension for the seat assembly 16, and may operate independently from the height adjustment system 70. As such, it is preferred that the suspension system 72 and height adjustment system 70 not include any common components.

INDUSTRIAL APPLICABILITY

Referring to FIGS. 1-4, an exemplary embodiment of a machine 10 may include a wheel tractor scraper, as shown, or any other machine or vehicle, having an operator control station 12. The operator control station 12 is mounted to a machine body 14 of the machine 10 and may include a seat assembly 16. The operator control station 12 may include various other devices, including, but not limited to, one or more machine operation controllers. For example, machine operation controller 46 may include a directional controller, while machine operation controller 48 may be used to control movement of an implement 18 of the machine 10. The seat assembly 16 may also include at least one of a height adjustment actuator 50 and a tilt adjustment actuator 52.

An operator of the machine 10 may have to remain seated, and typically coupled to the seat assembly 16 via a seatbelt, for extended periods of time while controlling operation of the machine 10. The seat assembly 16, therefore, should be designed to permit the operator to perform tasks from a comfortable position and isolate the operator, as much as possible, from vibrations of the machine 10. In addition, the seat assembly 16 should be designed to accommodate operators of various sizes and, as such, should allow for at least one of a height adjustment and a tilt adjustment of the seat assembly 16.

During a typical operation, an operator may sit in the seat assembly 16 and adjust the position of the seat assembly 16 using one or both of the height adjustment actuator 50 and the tilt adjustment actuator 52 for affecting a movement of the height adjustment system 70. Specifically, the height adjustment actuator 50 may be movable to adjust the seat assembly 16 to a desired height. According to one embodiment, shown in FIG. 3, the electronic controller 82 may be configured to issue signals to the electronically actuated locking devices 90 and 92 in response to a command from the height adjustment actuator 50. More specifically, the electronic controller 82 may disengage a locking feature of the electronically actuated locking devices 90 and 92 to allow telescopic movement of the telescoping guide pins 86 and 88.

Thereafter, the electronic controller 82 may issue a signal to the electronically actuated valve 76 of pneumatic bladder 74 to increase or decrease the volume of air within the pneumatic bladder 74, thereby adjusting the height of seat assembly 16. In addition, the operator may urge the seat assembly 16, and the second support member 62, about one or both of the horizontal axis X and the horizontal axis Y while the locking features of electronically actuated locking devices 90 and 92 are disengaged. After adjustment, the electronic controller 82 may issue signals to the electronically actuated locking devices 90 and 92 to engage the locking features thereof and prevent telescopic movement of the telescoping guide pins 86 and 88, thereby locking the desired position of the seat assembly 16.

According to another embodiment, shown in FIG. 4, the electronic controller 82 may issue signals to the electronically actuated locking devices 118, 120, 122, and 124 in response to a command from the height adjustment actuator 50 or tilt adjustment actuator 52. More specifically, the electronic controller 82 may disengage a locking feature of the electronically actuated locking devices 118, 120, 122, and 124 to allow telescopic movement of the telescoping guide pins 110, 112, 114, and 116. The electronic controller 82 may then issue signals to one or more of electronically actuated valves 134, 136, 138, and 140 to increase or decrease the volume of air within pneumatic bladders 126, 128, 130, and 132. It should be appreciated that the adjustment of air volume of pneumatic bladders 126, 128, 130, and 132 may or may not be uniform, depending on whether a height or tilt adjustment is selected.

For example, to tilt the seat assembly 16 in a first direction about the horizontal axis Y, the height of the pneumatic bladders 126 and 128 may be increased while the height of the pneumatic bladders 130 and 132 may be decreased. According to an additional example, to tilt the seat assembly 16 in a first direction about the horizontal axis X, the height of the pneumatic bladders 126 and 132 may be increased while the height of the pneumatic bladders 128 and 130 remains unchanged. After the selected height or tilt adjustment, the electronic controller 82 may issue signals to the electronically actuated locking devices 118, 120, 122, and 124 to engage the locking features thereof and prevent telescopic movement of the telescoping guide pins 110, 112, 114, and 116, thereby locking the selected adjustment.

Once at a desired position, the operator may actuate a machine operation controller, such as a directional controller 46, to move the machine 10 in a desired direction. As the machine 10 moves, it may encounter a rut that may impart forces and/or vibrations to the seat assembly 16. The suspension system 72 of the seat assembly 16 may absorb and/or dissipate the forces and/or vibrations using any known suspension system including, for example, a passive, active, or semi-active seat suspension. As such, the suspension system 72 may include any components necessary for providing suspension, damping, and/or guidance, independent from the height or tilt adjustment provided by the height adjustment system 70.

It should be appreciated that the base 40 of seat assembly 16 includes a suspension system 72 and a height adjustment system 70 that are positioned in series between first and third support members 60 and 64. As such, the suspension system 72 and height adjustment system 70 are uncoupled and, therefore, operate independently. For example, a height and/or tilt adjustment of the height adjustment system 70 will not alter suspension characteristics of the suspension system 72. Even at extreme positions of an allowable height range of the seat assembly 16, the suspension characteristics of the suspension system 72 will remain unchanged.

In addition, the base 40, as described herein, provides a versatile configuration for providing both suspension and height adjustment for the seat assembly 16. For example, the height adjustment system 70 may be used with any known suspension system 72. In addition, the height adjustment system 70 may provide a relatively simple, lightweight, and inexpensive means for providing height and/or tilt adjustment of the seat assembly 16.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A height adjustment system for a seat assembly of a machine, comprising:
a first support member;
a second support member vertically spaced from the first support member;
a pneumatic bladder operatively connected to the first support member and the second support member for adjusting a distance between the first support member and the second support member;
at least two guide pins interconnecting the first support member and the second support member at opposing ends thereof,
the two guide pins each including a locking device for maintaining an adjusted distance between the first support member and the second support member; and
a third support member vertically spaced from the second support member, wherein a suspension system is positioned between the second support member and the third support member.

2. The height adjustment system of claim 1, wherein the pneumatic bladder includes an electronically actuated valve in communication with a pneumatic source for controlling a fluid amount within the pneumatic bladder.

3. The height adjustment system of claim 2, including four telescoping guide pins interconnecting the first support member and the second support member at perimeters thereof, wherein each of the four telescoping guide pins includes the locking device.

4. The height adjustment system of claim 3, wherein the locking device of each of the four telescoping guide pins includes an electronically actuated locking device.

5. The height adjustment system of claim 4, wherein the locking device of each of the four telescoping guide pins includes an electronically actuated friction lock device.

6. The height adjustment system of claim 4, further including an electronic controller in communication with the electronically actuated valve of the pneumatic bladder and the electronically actuated locking device of each of the four telescoping guide pins.

7. The height adjustment system of claim 6, further including a height adjustment actuator in communication with the electronic controller, wherein the electronic controller is configured to issue signals to the electronically actuated valve of the pneumatic bladder and the electronically actuated locking device of each of the four telescoping guide pins in response to a command from the height adjustment actuator.

8. The height adjustment system of claim 6, further including at least one extension spring operatively connected to the first support member and the second support member for biasing the second support member toward the first support member.

9. The height adjustment system of claim 6, including four pneumatic bladders operatively connected to the first support member and the second support member for adjusting the distance between the first support member and the second support member, wherein each of the four pneumatic bladders includes an electronically actuated valve.

10. The height adjustment system of claim 9, further including a tilt adjustment actuator in communication with the electronic controller, wherein the electronic controller is configured to issue a signal to the electronically actuated valve of at least one pneumatic bladder in response to a command from the tilt adjustment actuator.

* * * * *